(12) United States Patent
Boutwell et al.

(10) Patent No.: US 8,173,206 B2
(45) Date of Patent: May 8, 2012

(54) METHODS FOR REPAIRING BARRIER COATINGS

(75) Inventors: Brett Allen Boutwell, West Chester, OH (US); Glen Harold Kirby, Liberty Township, OH (US); Jessica Lee Licardi, Mason, OH (US); Jeffrey Allan Pfaendtner, Deephaven, MN (US); James Dale Steibel, Mason, OH (US)

(73) Assignee: General Electric Company, Schenectady, NY (US)

( * ) Notice: Subject to any disclaimer, the term of this patent is extended or adjusted under 35 U.S.C. 154(b) by 544 days.

(21) Appl. No.: 11/960,764

(22) Filed: Dec. 20, 2007

(65) Prior Publication Data

US 2009/0162539 A1    Jun. 25, 2009

(51) Int. Cl.
*B05C 13/00* (2006.01)

(52) U.S. Cl. .......... 427/142; 427/66; 427/140; 427/446; 427/452; 313/498; 313/506; 313/509; 313/503; 428/690

(58) Field of Classification Search ................. 427/142, 427/66, 140, 446, 452, 453; 313/498, 506, 313/509, 503; 445/24; 428/690
See application file for complete search history.

(56) References Cited

U.S. PATENT DOCUMENTS

| 6,165,600 | A | 12/2000 | Ivkovich, Jr. et al. |
| 6,375,451 | B1 | 4/2002 | Robinson et al. |
| 6,465,090 | B1 * | 10/2002 | Stowell et al. ............... 428/325 |
| 7,015,640 | B2 | 3/2006 | Schaepkens et al. |
| 2004/0029706 | A1 | 2/2004 | Barrera et al. |
| 2005/0112381 | A1 | 5/2005 | Raybould et al. |
| 2005/0129868 | A1 * | 6/2005 | Philip et al. ............... 427/452 |

FOREIGN PATENT DOCUMENTS

| EP | 1837104 A | 9/2007 |
| WO | 03026886 A | 4/2003 |
| WO | 2007130417 A | 11/2007 |
| WO | 2008085550 A | 7/2008 |

OTHER PUBLICATIONS

PCT/US2008/081847, Search Report and Written Opinion, Feb. 25, 2010.
PCT/US2008/081852, Search Report and Written Opinion, Jan. 23, 2009.
PCT/US2008/081854, Search Report and Written Opinion, Oct. 7, 2009.

* cited by examiner

*Primary Examiner* — Nadine Norton
*Assistant Examiner* — Maki A Angadi
(74) *Attorney, Agent, or Firm* — General Electric Company; David J. Clement; William Scott Andes

(57) ABSTRACT

Methods for repairing barrier coatings involving providing a component having a barrier coating including at least one damaged portion, removing the damaged portion of the barrier coating leaving a void, applying a replacement tape cast barrier coating to the void of the component, and sintering the component having the replacement tape cast barrier coating layer.

17 Claims, 2 Drawing Sheets

METHODS FOR REPAIRING BARRIER COATINGS

TECHNICAL FIELD

Embodiments described herein generally relate to methods for repairing barrier coatings. More particularly, embodiments herein generally describe methods for repairing barrier coatings using barrier coatings tapes.

BACKGROUND OF THE INVENTION

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. While superalloys have found wide use for components used throughout gas turbine engines, and especially in the higher temperature sections, alternative lighter-weight substrate materials have been proposed.

Ceramic matrix composites (CMCs) are a class of materials that consist of a reinforcing material surrounded by a ceramic matrix phase. Such materials, along with certain monolithic ceramics (i.e. ceramic materials without a reinforcing material), are currently being used for higher temperature applications. Some examples of common CMC matrix materials can include silicon carbide, silicon nitride, alumina, silica, mullite, alumina-silica, alumina-mullite, and alumina-silica-boron oxide. Some examples of common CMC reinforcing materials can include, but should not be limited to, silicon carbide, silicon nitride, alumina, silica, mullite, alumina-silica, alumina-mullite, and alumina-silica-boron oxide. Some examples of monolithic ceramics may include silicon carbide, silicon nitride, silicon aluminum oxynitride (SiAlON), and alumina. Using these ceramic materials can decrease the weight, yet maintain the strength and durability, of turbine components. Therefore, such materials are currently being considered for many gas turbine components used in higher temperature sections of gas turbine engines, such as airfoils (e.g. compressors, turbines, and vanes), combustors, shrouds and other like components that would benefit from the lighter-weight these materials can offer.

CMC and monolithic ceramic components can be coated with environmental barrier coatings (EBCs) and/or thermal barrier coatings (TBCs) to protect them from the harsh environment of high temperature engine sections. EBCs can provide a dense, hermetic seal against the corrosive gases in the hot combustion environment while TBCs can set up a thermal gradient between the coating surface and the backside of the component, which is actively cooled. In this way, the surface temperature of the component can be reduced below the surface temperature of the TBC. In some instances, a TBC may also be deposited on top of an EBC in order to reduce the surface temperature of the EBC to below the surface temperature of the TBC. This approach lowers the operating temperature at which the EBC must perform and as a result, can increase the operating life of the EBC.

Currently, most EBCs consist of a three-layer coating system including a silicon bond coat layer, at least one transition layer comprising mullite, barium strontium aluminosilicate (BSAS), a rare earth disilicate, or a combination thereof, and an outer layer comprising BSAS, a rare earth monosilicate, or a combination thereof. The rare earth elements in the mono- and disilicate coating layers may comprise yttrium, leutecium, ytterbium, or some combination thereof. Together, these layers can provide environmental protection for the component.

TBCs generally consist of refractory oxide materials that are deposited with special microstructures to mitigate thermal or mechanical stresses due to thermal expansion mismatch or contact with other components in the engine environment. These microstructures may include dense coating layers with vertical cracks or grains, porous microstructures, and combinations thereof. The refractory oxide material typically comprises yttria-doped zirconia, yttria-doped hafnia, but may also include zirconia or hafnia doped with calcia, baria, magnesia, strontia, ceria, ytterbia, leuticium oxide, gadolinium oxide, neodymium oxide, and any combination of the same. Other examples of acceptable refractory oxides for use as a TBC can include, but should not be limited to, yttrium disilicate, ytterbium disilicate, lutetium disilicate, yttrium monosilicate, ytterbium monosilicate, lutetium monosilicate, zircon, hafnon, BSAS, mullite, magnesium aluminate spinel, and rare earth aluminates.

Regardless of composition or substrate, most EBCs and/or TBCs are generally applied using one of conventional air-plasma spraying (APS), slurry dipping, chemical vapor deposition (CVD), or electron beam physical vapor deposition (EBPVD). Unfortunately, none of these methods are without issue. For example, air-plasma spraying is generally limited to line-of-site applications. As most high temperature gas turbine engine components would benefit from both exterior and interior coating with a barrier coating, APS may not be the method of choice for such applications. Additionally, while slurry dipping can provide some cost savings and can cover additional areas of the component (i.e. internal passages) when compared to APS, it is designed for thin coatings. Since some high temperature gas turbine engine components would benefit from thicker coatings, slurry dipping may not be suitable for all applications. EBPVD and CVD tend to be more costly than APS and slurry dipping, and are generally useful for thin coating applications only due to slow deposition rates.

Furthermore, repairing EBCs and TBCs applied using traditional methods can be complex and costly, typically requiring the entire coating to be stripped and replaced.

Therefore, there remains a need for improved methods for repairing barrier coatings.

BRIEF DESCRIPTION OF THE INVENTION

Embodiments herein generally relate to methods for repairing barrier coatings comprising providing a component having a barrier coating comprising at least one damaged portion, removing the damaged portion of the barrier coating leaving a void, applying a replacement tape cast barrier coating to the void of the component, and sintering the component having the replacement tape cast barrier coating layer.

Embodiments herein also generally relate to methods for repairing barrier coatings comprising providing a gas turbine engine component having a barrier coating comprising at least one damaged portion, removing the damaged portion of the barrier coating leaving a void, applying a replacement tape cast barrier coating to the void of the gas turbine engine component, and sintering the gas turbine engine component having the replacement tape cast barrier coating layer wherein the gas turbine engine component is selected from the group consisting of vanes, blades, shrouds, nozzles, flaps, seals, and combustors.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Figure 1:
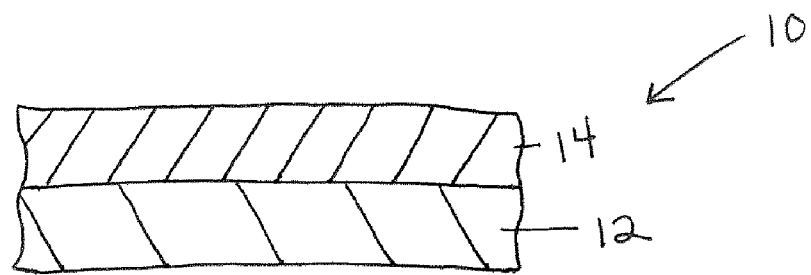
FIG. 1 is a schematic cross-section of one embodiment of a tape in accordance with the description herein.

Embodiments described herein generally relate to methods for repairing barrier coatings. More particularly, embodiments herein generally describe methods for repairing barrier coatings on gas turbine engine component using barrier coating tapes.

The tape cast barrier coatings (or "barrier coating tapes") described herein may be suitable for use in conjunction with components comprising CMCs, monolithic ceramics, and superalloys. As used herein, "CMCs" refers to both silicon-containing matrix and reinforcing materials and oxide-oxide matrix and reinforcing materials. Some examples of CMCs acceptable for use herein can include, but should not be limited to, materials having a matrix and reinforcing fibers comprising silicon carbide, silicon nitride, alumina, silica, mullite, alumina-mullite, alumina-silica, alumina-silica-boron oxide, and combinations thereof. As used herein, "monolithic ceramics" refers to materials comprising silicon carbide, silicon nitride, silicon aluminum oxynitride (SiAlON), and alumina. Herein, CMCs and monolithic ceramics are collectively referred to as "ceramics." Some examples of superalloys can include, but should not be limited to, iron, nickel, and cobalt-based superalloys. As used herein, the term "barrier coating(s)" can refer to both environmental barrier coatings (EBCs) and thermal barrier coatings (TBCs), and may comprise at least one barrier coating composition, as described herein below. The barrier coatings herein may be suitable for use in high temperature environments, such as those present in gas turbine engines.

More specifically, the EBCs herein may generally be comprised of an environmental barrier coating selected from the group consisting of BSAS, a rare earth monosilicate, a rare earth disilicate, mullite, silicon, and combinations thereof. The TBCs may generally comprise a thermal barrier coating composition selected from the group consisting of yttria-stabilized zirconia, yttria-stabilized hafnia, zirconia or hafnia stabilized with calcia, baria, magnesia, strontia, ceria, ytterbia, leuticia, and combinations thereof. Other refractory compositions that may be suitable for use as a TBC may include, but should not be limited to, rare earth disilicates (for example, yttrium disilicate, ytterbium disilicate, and lutetium disilicate), rare earth monosilicates (for example, ytterbium monosilicate, and lutetium monosilicate), zircon, hafnon, BSAS, mullite, magnesium aluminate spinel, rare earth aluminates, and combinations thereof. Together, as used herein, these environmental barrier coating compositions and thermal barrier coating compositions are collectively referred to as "barrier coating compositions."

To prepare the barrier coating tapes, a slurry comprising at least one barrier coating composition may be made. In addition to the barrier coating composition, the slurry may also comprise any of a solvent, a dispersant, a binder, and a plasticizer, as explained herein below.

Initially, a ceramic mixing media selected from the group consisting of alumina, zirconia, silicon carbide, and the like may be provided in a suitable container. The mixing media can account for from about 5% to about 50% of the volume of the mixing container. The solvent, dispersant and barrier coating composition may then be added to the container media with mixing. As used herein, "mixing" refers to any conventional technique known to those skilled in the art suitable for combining compositions, including but not limited to, stirring, shaking, rolling, ball milling, vibratory milling, planetary milling, impeller milling, paddle type milling, and attrition milling.

While the amount of barrier coating composition, solvent, and dispersant included may vary, in general, the slurry may comprise from about 12 vol % to about 36 vol %, and in one embodiment from about 17 vol % to about 24 vol %, of the barrier coating composition; from about 40 vol % to about 60 vol %, and in one embodiment from about 50 vol % to about 55 vol %, of the solvent; and from about 0 vol % to about 6 vol %, and in one embodiment from about 0 vol % to about 2 vol %, of a dispersant, thus making the dispersant optional. The solvent may be, but should not be limited to, the group consisting of ethyl alcohol, methyl alcohol, acetone, isopropyl alcohol, toluene, methyl isobutyl ketone, xylene, and combinations thereof, and the dispersant may be any solvent-soluble, polymeric material of 200-20,000 g/mole that can adsorb to the ceramic particles of the mixing media, imparting a repulsive force therebetween. Some examples of suitable dispersant can include, for example, Zephrym® PD700 (I.C.I. Specialty Chemicals of Wilmington, Del.), Merpol A (Stepan Company, Northfield, Ill.), Phospholan™ PS21-A (Akzo Nobel Surface Chemistry LLC, Chicago, Ill.), and Menhaden fish oil (Sigma-Aldrich, St. Louis, Mo.).

Once combined, the slurry comprising the mixing media, solvent, dispersant, and barrier coating composition may continue to be mixed for any suitable length of time. It is desirable to mix the slurry with enough energy to breakdown the agglomerates into primary particles, and until the slurry appears smooth, which can typically take from about 4 to about 24 hours. After mixing is complete, the mixing media may be removed. Since the mixing media remains a solid, it may be removed by, for example, pouring the slurry through a mesh screen and/or using a vibration table.

After removing the mixing media, the binder and plasticizer may be added to the remaining slurry, again with mixing. The binder may be selected from polyvinyl butyral, polymethylmethacrylate, polyvinyl alcohol, polyethylene, an acrylic emulsion, and the like. From about 4 vol % to about 15 vol % of the binder may be added. Similarly, the plasticizer may be selected from the group consisting of dibutyl phthalate, dioctyl phthalate, benzyl butyl phthalate, polyethylene glycol, and the like. From about 4 vol % to about 15 vol % of the plasticizer may be added.

Any conventional tape cast machine may be utilized to make the tape cast barrier coatings herein. Common tape casting processes known to those skilled in the art are acceptable for use herein. See, for example, U.S. Pat. No. 6,375,451. In general, the tape casting machine can have an adjustable doctor blade that can be set as desired to achieve the desired tape thickness, being careful to account for shrinkage in order to obtain the correct tape thickness after drying and sintering. The slurry may be added to the machine by pouring the slurry into a reservoir containing a carrier film, such as a silicone-coated, biaxially-oriented plyethylene terephthalate (boPET) polyester film, such as Mylar®.

In one embodiment, the carrier film can be set in motion such that it moves beneath the doctor blade to meter away excess slurry and produce a cast slurry layer having a thickness defined by the doctor blade height. In an alternate embodiment, the doctor blade can be pulled across the slurry to remove excess slurry and produce a cast slurry layer on top of the carrier film. The cast slurry may then be allowed to dry as the solvents evaporate to produce a tape. In continuous tape casting operations, the drying process can occur while the carrier film is in motion. In batch casting operations, the tape can be produced by stopping the motion of the carrier film and allowing the tape to dry before continuing on to produce another batch. Regardless of the operation used, the resulting "tape," 10 which comprises the carrier film 12 and at least one barrier coating composition 14, can be flexible enough to be rolled onto a spool yet mechanically durable enough to be peeled away from the carrier film without sustaining damage, as described below, and as shown generally in FIG. 1.

The tape may then be applied to a ceramic component (i.e. CMC or monolithic ceramic) in need of environmental and/or thermal barrier protection or a superalloy component in need of thermal barrier protection. The tape may initially be cut into the desired shape as determined by its intended use. Either the tape, or the surface of the ceramic or superalloy component that the tape is being attached to, can be sprayed with a mist of solvent to produce an adhesive surface that can be slightly tacky to the touch. This adhesive surface can help to hold the tape in place for further processing. In one embodiment, the solvent may be the same solvent used previously to make the slurry. The tape can then be applied to the desired portion of the ceramic or superalloy component and the carrier film removed, leaving a "barrier coating tape 18," which can have a glass transition temperature of from about −35° C. to about 67° C., and in one embodiment, from about −20° C. to about 20° C. Optionally, an autoclave cycle may be used to help bond the barrier coating tape to the component. If utilized, the autoclave cycle can be carried out at temperatures of from about 150° C. to about 400° C. and pressures of from about atmospheric pressure to about 500 psi.

Figure 2:
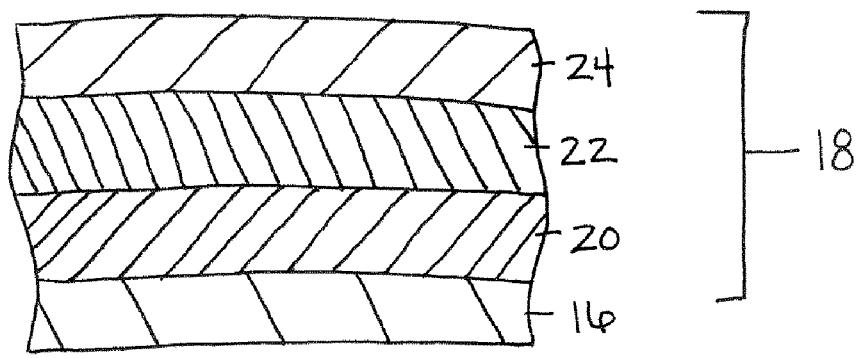
FIG. 2 is a schematic cross-section of one embodiment of a component having a plurality of layers of the barrier coating tape applied thereto in accordance with the description herein.
Figure 3:
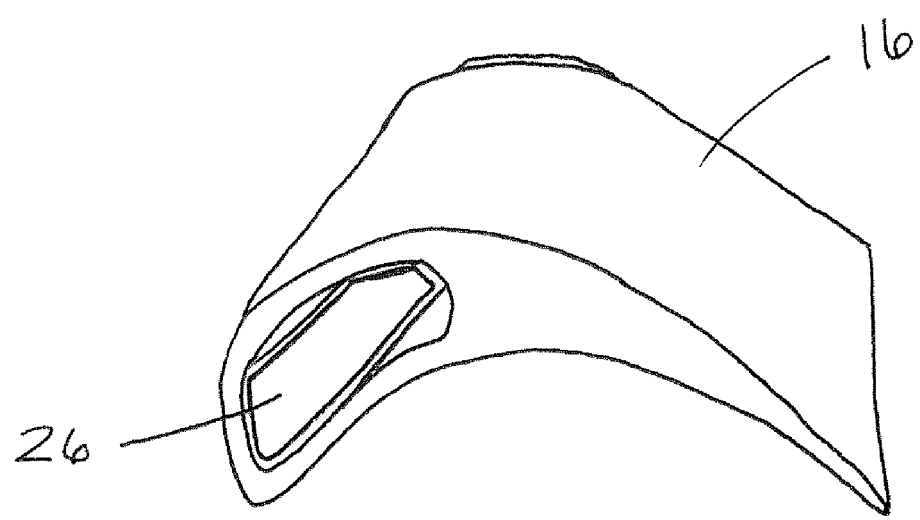
FIG. 3 is a schematic perspective bottom view of one embodiment of a gas turbine airfoil having a barrier coating in accordance with the description herein.

A plurality of layers of barrier coating tape 18 may be applied to component 16 to achieve the desired barrier coating protection, as shown in FIG. 2. As used herein, "barrier coating tape" may comprise one layer, or a plurality of layers, as described herein below. For example, an EBC can me made by applying three layers barrier coating tape 18 to the component, with a first layer 20 representing a bond coat layer, a second layer 22 representing a transition layer, and a third layer 24 representing an outer layer. In this instance, each layer can comprise a different barrier coating composition or combination of barrier coating compositions that can be applied to the component one on top of the other to produce the desired three-layered EBC. Those skilled in the art will understand that such layering is also applicable to TBCs. The component having the applied barrier coating tape can then be sintered to burnout the binder and obtain a component 16 comprising a barrier coating 26 having the desired microstructure, as shown generally in FIG. 3.

If the barrier coating tape is being sintered on a silicon-containing CMC component, sintering can be carried out at a temperature of 1500° C. or below, and in one embodiment from about 400° C. to about 1500° C. If the barrier coating tape is being sintered on an oxide-oxide CMC component, sintering may be carried out at a temperature of 2000° C. or below, and in one embodiment, from about 400° C. to about 2000° C. If the barrier coating tape is being sintered on a monolithic ceramic, sintering may be carried out at a temperature of from about 400° C. to about 2000° C., and in one embodiment from about 400° C. to about 1600° C. If the barrier coating tape is being sintered on a superalloy component, sintering can be carried out at a temperature of from about 400° C. to about 1315° C., depending on the superalloy selected.

In one embodiment, the microstructure of the barrier coating can be from about 90% dense to about 100% dense to provide a hermetic seal against hot gases in a combustion environment, thereby making the tape suitable for use an EBC, or TBC if there is a thermal expansion match between the thermal barrier coating and component. In another embodiment, the microstructure of the barrier coating can be from about 90% to about 100% dense and vertically cracked to function as a TBC. In another embodiment, the microstructure of the barrier coating can be porous (i.e. less than about 90% dense), or porous and vertically cracked to function as a TBC. In still another embodiment, the microstructure of the barrier coating may be porous and function as an abradable EBC coating. Those skilled in the art will understand that density may be measured using conventional techniques, including SEM cross-section or immersion.

More specifically, in such instances, the EBC can include a primary layer comprising an EBC having a dense microstructure as defined previously, and a secondary layer comprising an abradable EBC, having a porous microstructure, as described previously herein. The secondary layer can be applied to the primary layer. Such two-layer EBCs can be useful on engine components such as shrouds, where it is beneficial to maintain a small gap between the shroud and the tip of the rotating fan blades to maximize engine efficiency. Due to the narrowness of the gap between the shroud and the fan blade tips, rub events may occur in which the tip of the blade can scrape across the surface of the shroud, damaging the shroud and the primary layer comprising the dense EBC. If a secondary layer comprising an abradable EBC is present, the blade tip can rub the abradable secondary layer, abrading some of it away, rather than contacting and damaging the underlying primary layer or the shroud.

The tape cast barrier coatings described herein can offer several benefits over barrier coatings applied using conventional techniques. For example, as previously mentioned, the tape cast barrier coatings herein may be cast to any thickness desired. In one embodiment, the thickness may be from about 0.1 mils to about 100 mils, which could satisfy both thin coating requirements for such components as airfoils, or thick abradable coating requirements for such components as shrouds. Additionally, the tape cast barrier coatings can overcome line-of-sight issues presented by conventional barrier coatings, thereby allowing the barrier coating tape to be conveniently placed both externally and internally on the component.

Moreover, the tape cast barrier coatings can offer improved ease of repair. In contrast to the complex process for repairing EBCs and TBCs applied using traditional methods, barrier coating tapes allow for local defect repair by removing the damaged portion of the barrier coating from the component leaving a void, applying a replacement barrier coating tape to the void of the component, and then sintering the component having the replacement barrier coating tape to burn out the binders and densify the barrier coating tape to produce a new barrier coating. In the case of multiple layers of barrier coating, each layer can be fired individually or the layers can be co-fired. Those skilled in the art will understand that the repair method described herein may be used to repair tape cast barrier coatings or barrier coatings applied using conventional methods.

Some ceramic or superalloy gas turbine engine components that could benefit from the application of the presently described barrier coating tapes can include, but should not be limited to vanes, blades, shrouds, nozzles, flaps, seals, and combustors. More particularly, vanes, blades, and nozzles can benefit from having the ability to apply the barrier coating tapes onto inner and outer surfaces with minimal waste. Shrouds can benefit from the ability to make thick abradable coatings. Flaps, seals, and shrouds are simple geometries where barrier coating tape application would be a straightforward, robust process that can avoid the overspray associated with current APS processes. Combustors are large components that can be difficult to plasma spray or dip. Therefore, combustors can benefit for ease of application of barrier coating tapes to both the inner and outer surfaces. In addition, barrier coating tapes may also be locally applied over existing environmental or thermal barrier layers to build up extra layers of protection on specific component locations, such as airfoil platforms or tips.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for repairing a barrier coating comprising:
   providing a component having a barrier coating comprising at least one damaged portion;
   removing the damaged portion of the barrier coating leaving a void in the barrier coating;
   applying a replacement tape cast barrier coating to the void of the barrier coating; and
   sintering the component having the replacement tape cast barrier coating layer.

2. The method of claim 1 wherein the component is a gas turbine engine component selected from the group consisting of vanes, blades, shrouds, nozzles, flaps, seals, and combustors.

3. The method of claim 2 wherein the component comprises a ceramic selected from the group consisting of silicon carbide, silicon nitride, alumina, silica, mullite, alumina-mullite, alumina-silica, alumina-silica-boron oxide, silicon aluminum oxynitride, and combinations thereof.

4. The method of claim 2 wherein the component comprises a superalloy selected from the group consisting of iron-based superalloys, nickel-based superalloys, and cobalt-based superalloys.

5. The method of claim 1 wherein the barrier coating composition comprises at least one of an environmental barrier coating composition or a thermal barrier coating composition.

6. The method of claim 5 wherein the barrier coating composition comprises an environmental barrier coating composition selected from the group consisting of BSAS, a rare earth monosilicate, a rare earth disilicate, mullite, silicon, and combinations thereof.

7. The method of claim 5 wherein the barrier coating composition comprises a thermal barrier coating selected from the group consisting of yttria-stabilized zirconia, yttria-stabilized hafnia, zirconia stabilized with calcia, baria, magnesia, strontia, ceria, ytterbia, leuticium oxide, gadolinium oxide, neodymium oxide, and combinations thereof, hafnia stabilized with calcia, baria, magnesia, strontia, ceria, ytterbia, leuticia, and combinations thereof, rare earth disilicates, rare earth monosilicates, zircon, hafnon, BSAS, mullite, magnesium aluminate spinel, rare earth aluminates, and combinations thereof.

8. The method of claim 1 wherein sintering comprises heating the component having the tape cast barrier coating to a temperature of from about 400° C. to about 1500° C. when the component comprises a silicon-containing ceramic matrix composite; from about 400° C. to about 2000° C. when the component comprises an oxide-oxide ceramic matrix composite; from about 400° C. to about 2000° C. when the component comprises a monolithic ceramic; and from about 400° C. to about 1315° C. when the component comprises a superalloy.

9. The method of claim 1 wherein applying the applying the replacement tape cast barrier coating comprises:
   applying at least a first layer of tape to the component wherein the tape comprises:
      a carrier film; and
      at least one barrier coating composition applied to the carrier film; and
   removing the carrier film to produce the replacement tape cast barrier coating.

10. A method for repairing a barrier coating comprising:
    providing a gas turbine engine component having a barrier coating comprising at least one damaged portion;
    removing the damaged portion of the barrier coating leaving a void in the barrier coating;
    applying a replacement tape cast barrier coating to the void of the barrier coating; and
    sintering the gas turbine engine component having the replacement tape cast barrier coating layer
    wherein the gas turbine engine component is selected from the group consisting of vanes, blades, shrouds, nozzles, flaps, seals, and combustors.

11. The method of claim 10 wherein the gas turbine engine component comprises a ceramic selected from the group consisting of silicon carbide, silicon nitride, alumina, silica, mullite, alumina-mullite, alumina-silica, alumina-silica-boron oxide, silicon aluminum oxynitride, and combinations thereof.

12. The method of claim 10 wherein the gas turbine engine component comprises a superalloy selected from the group consisting of iron-based superalloys, nickel-based superalloys, and cobalt-based superalloys.

13. The method of claim 10 wherein the barrier coating composition comprises at least one of an environmental barrier coating composition or a thermal barrier coating composition.

14. The method of claim 13 wherein the barrier coating composition comprises an environmental barrier coating composition selected from the group consisting of BSAS, a rare earth monosilicate, a rare earth disilicate, mullite, silicon, and combinations thereof.

15. The method of claim 13 wherein the barrier coating composition comprises a thermal barrier coating selected from the group consisting of yttria-stabilized zirconia, yttria-stabilized hafnia, zirconia stabilized with calcia, baria, magnesia, strontia, ceria, ytterbia, leuticia, and combinations thereof, hafnia stabilized with calcia, baria, magnesia, strontia, ceria, ytterbia, leuticium oxide, gadolinium oxide, neodymium oxide, and combinations thereof, rare earth disilicates, rare earth monosilicates, zircon, hafnon, BSAS, mullite, magnesium aluminate spinel, rare earth aluminates, and combinations thereof.

16. The method of claim 13 wherein applying the applying the replacement tape cast barrier coating comprises:
applying at least a first layer of tape to the component wherein the tape comprises:
a carrier film; and
at least one barrier coating composition applied to the carrier film; and
removing the carrier film to produce the replacement tape cast barrier coating.

17. The method of claim 10 wherein sintering comprises heating the component having the tape cast barrier coating to a temperature of from about 400° C. to about 1500° C. when the component comprises a silicon-containing ceramic matrix composite; from about 400° C. to about 2000° C. when the component comprises an oxide-oxide ceramic matrix composite; from about 400° C. to about 2000° C. when the component comprises a monolithic ceramic; and from about 400° C. to about 1315° C. when the component comprises a superalloy.

* * * * *